United States Patent Office 3,733,409
Patented May 15, 1973

3,733,409
METHOD OF TREATING HYPERTENSION USING THIENO [1,2,4] THIADIAZINES
John G. Topliss, West Caldwell, N.J., assignor to Schering Corporation, Bloomfield, N.J.
No Drawing. Original application May 20, 1969, Ser. No. 826,293, now Patent No. 3,641,017, dated Feb. 8, 1972. Divided and this application May 10, 1971, Ser. No. 141,969
Int. Cl. A61b 27/00
U.S. Cl. 424—246      7 Claims

ABSTRACT OF THE DISCLOSURE

This invention relates to novel substituted thieno [1,2,4] thiadiazine-1,1-dioxides, to methods for preparing and to methods for using the same as anti-hypertensive agents.

---

This application is a divisional of application Ser. No. 826,293, filed May 20, 1969 now U.S. Pat. No. 3,641,017, issued Feb. 8, 1972.

This application relates to compositions of matter classified in the art of chemistry as substituted thieno [1,2,4] thiadiazines and to processes for making and using such compositions.

The invention sought to be patented, in its composition aspect, is described in the concept of chemical compounds having a molecular structure in which there is attached, to a thieno [1,2,4] thiadiazine-1,1-dioxide nucleus, a substitutent R in the 3-position and wherein there is attached to the thieno moiety of the thieno [1,2,4] thiadiazine-1,1-dioxide molecule, substituents X and Y.

It is known to chemists that a thieno [1,2,4] thiadiazine-1,1-dioxide may exist in either one of two tautomeric forms. In one form the double bond is between the 3- and 4-position atoms whereas in the other form the double bond is between the 2- and 3-position atoms. The inventor contemplates both tautomeric structures as being within the scope of his invention.

Thus, the physical embodiments of this invention may be considered to be a member selected from the group consisting of compounds of the formula:

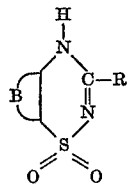

and the tautomers and the alkali metal salts thereof, wherein R is a member selected from the group consisting of hydrogen, lower alkyl, halogeno lower alkyl, lower alkenyl, phenyl, benzyl and phenethyl; B together with the carbon atoms to which it is attached represents a fused X, Y-substituted thieno moiety wherein X is a member selected from the group consisting of halogen, trifluoromethyl and lower alkyl and Y is a member selected from the group consisting of hydrogen, halogen, trifluoromethyl and lower alkyl; provided that when Y is adjacent to the sulfur atom of the thieno moiety, it is other than hydrogen.

As those skilled in the art will readily see, the thieno moiety of the thieno [1,2,4] thiadiazine-1,1-dioxide molecule may be fused to the thiadiazine-1,1-dioxide moiety in such a manner as to give rise to the existence of three isomers with respect to the position of the sulfur atom. The three isomeric forms may be depicted as follows:

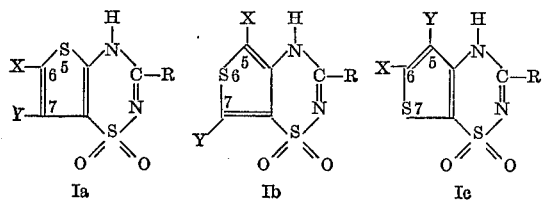

Ia   Ib   Ic wherein X, Y and R are as previously defined. The foregoing thieno [1,2,4] thiadiazine-1,1-dioxide position isomers are named as follows:

3R-6X-7Y-thieno [2,3-e] [1,2,4] thiadiazine-1,1-dioxide,
3R-5X-7Y-thieno [3,4-e] [1,2,4] thiadiazine-1,1-dioxide and
3R-6X-5Y-thieno [3,2-e] [1,2,4] thiadiazine-1,1-dioxide, respectively.

The inventor considers each of the above-depicted position isomers to be equivalent and to be fully within the scope of this invention.

For convenience, the compounds of this invention will generally be depicted as the tautomer with the double bond between the 2- and 3-position atoms.

The tangible embodiments of the composition aspect of this invention possesses inherent general physical properties which depend upon the nature of the substituent groups, if any, that are present. Generally, they are high melting, crystalline solids; and are obtained by evaporation of water or a polar organic solvent. Examination of the compounds of this invention reveals upon ultraviolet, infrared and nuclear magnetic spectrographic analysis absorption patterns that may be reasonably expected from such compounds including evidence of the C=N and the cyclized nucleus.

As used herein the term "lower alkyl" includes straight and branched-chain radicals, such as, methyl, ethyl, propyl, and isopropyl, t-butyl, iso-amyl and the cyclized lower alkyl radicals, such as cyclopropyl, cyclobutyl, cyclopentyl and the like.

The term "lower alkenyl" means a mono-unsaturated lower alkyl radical and includes straight and branched-chain radicals, such as, ethylene, 2-pentene, propylene, isobutylene, 2-methylbutene-1, and the cyclized lower alkenyl radicals such as cyclopropene, cyclopentene, cyclohexene and the like.

The manner and processes for making the tangible embodiments of the invention will now be generally described so as to enable a person skilled in the art of chemistry to make the same. The starting compounds for these processes are described generally in Elderfield's Heterocyclic Compounds, volume I, Wiley (1950) and in Thiophene and Its Derivatives, Edward D. Hartough, Interscience Publishers (1952). In general, X, Y-substituted 2-nitrothiophenes (II) are employed as starting materials. These compounds are subjected to a reductive acylation using, for example, zinc in a mixture of a hydrocarbon carboxylic acid and the corresponding acid anhydride to yield the X, Y-substituted acylaminodothiophene of which X, Y-substituted 2-acylamindothiophene (III) is exemplary. The reductive acylation is generally conducted at a temperature range of from about −20° C. to about 20° C. for about 1 to about 5 hours followed by a brief (15 to 60 minutes) treatment at elevated temperatures (e.g. 50°–90° C.), preferably at about 70° C. The hydrocarbon carboxylic acid and its anhydride serve as solvents for the reaction in addition to their role as acylating agents. The resulting X, Y-substituted-acylamidothiophene is chlorosulfonated then aminated to yield the corresponding acylamido thiophene having a sulfonamide substituent adjacent to the acylamido group. This class of intermediates is exemplified by the X, Y-substituted-2-acylamidothiophene-3-sulfonamide (IV) shown below. The chlorosulfonation is effected by known methods such as treatment with chlorosulfonic acid and phosphorous pentachloride. The amination is effected by treatment of the chlorosulfonation product with ammonia in an inert organic solvent, such as an aromatic hydrocarbon or an ether or the like. Alternatively, the foregoing reactions may be effected by other reaction schemes known to those skilled in the art. Cyclization of this class of intermediates is conveniently effected by treatment with aqueous base such as about 1% to about 15%, preferably 10% sodium carbonate solution, treatment with about 0.1% to about 10%, preferably 5% sodium hydroxide solution or treatment with about 5% to about 25% aqueous trimethylamine solution. When performed under aqueous conditions, the cyclization is usually at temperatures of from about 40° C. to about 100° C., preferably about 90° C. and from about ½ to about 5 hours, preferably about 1½ hours. The cyclization may also be effected under non-aqueous conditions using sodium methoxide or potassium t-butoxide in such solvents as, methanol, t-butanol, dimethylacetamide, dimethylformamide and the like. When the reaction is effected under non-aqueous conditions it is usually performed at a temperature range of from about 30° to about 150° C. and over a time interval of from about ½ to about 10 hours. The cyclization reaction may also be effected in the absence of solvent and in the absence of base by heating the uncyclized intermediate (IV) at about its melting point causing intramolecular dehydration and cyclization to occur. This series of reactions is illustrated as follows:

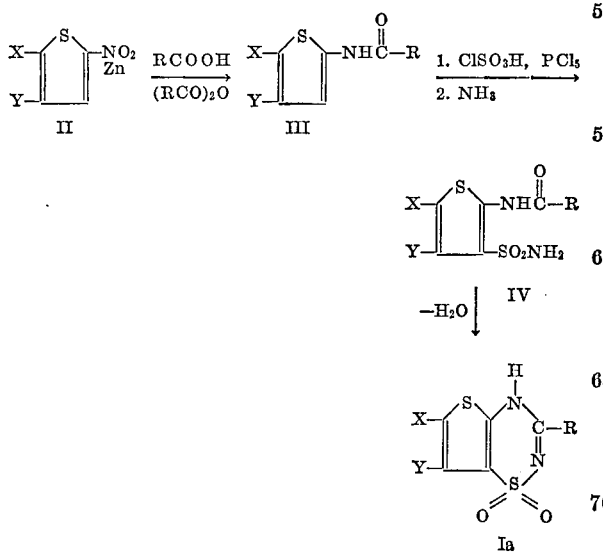

wherein X, Y and R are as previously defined.

The preparation of the isomeric thieno[3,2-e][1,2,4]thiadiazine-1,1-dioxides by the foregoing sequence of reactions is depicted as follows:

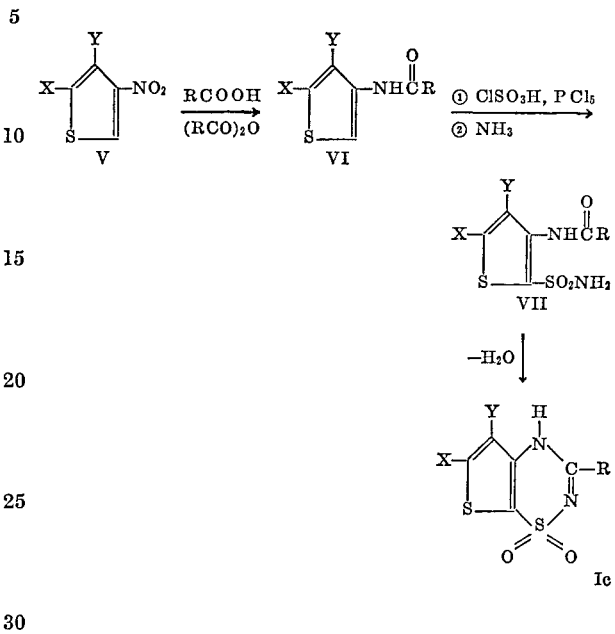

wherein X, Y and R are as previously defined.

Similarly, by selecting the appropriate X, Y-substituted 3-nitrothiophene and following the foregoing reaction sequence, the isomeric thieno[3,4-e][1,2,4]thiadiazine-1,1-dioxides may be prepared as can be seen from the following series of reactions:

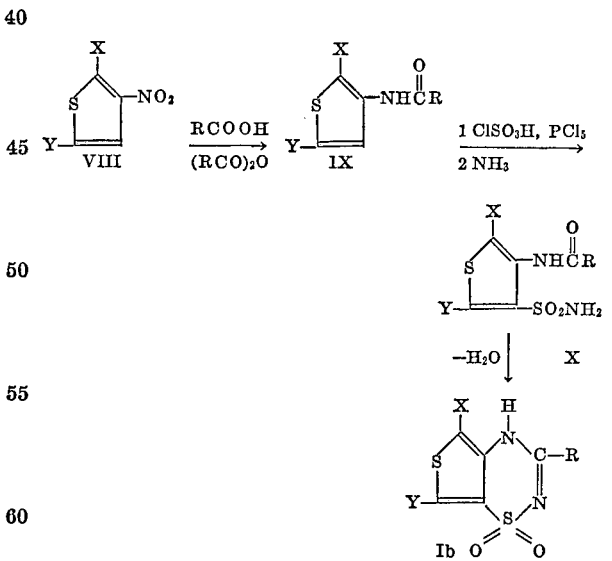

wherein X, Y and R are as previously defined.

Alternatively, the compounds of this invention may be prepared by utilizing an appropriately X, Y-substituted acyl thiophene, such as the X, Y-substituted-2 acyl thiophene of Formula VI below. This method is especially useful for preparing compounds of this invention wherein R=lower alkyl. Compound (XI) is reacted with hydroxylamine under standard reaction conditions to form the oxime (XII) of the acyl moiety which is subsequently caused to undergo a Beckmann rearrangement to form the corresponding acylamido analog (XIII). The steps necessary to prepare the final products parallel those described above. This series of reactions is illustrated as follows:

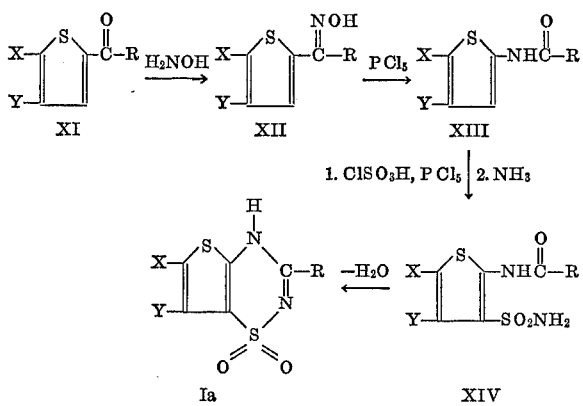

wherein X, Y and R are as previously defined.

In similar manner, by selecting the appropriate X, Y-substituted acyl thiophene and following the reaction sequence set forth above, the thieno [3,2-e][1,2,4]thiadiazine - 1,1 - dioxides and the thieno[3,4-e][1,2,4]thiadiazine-1,1-dioxides isomers may be prepared.

The following examples are set forth for the purpose of illustration and are not intended to limit the scope of the invention.

EXAMPLE 1

6-chloro-3-methyl-4H-thieno[2,3-e][1,2,4]thiadiazine-1,1-dioxide

To a stirred mixture of 10 ml. of chlorosulfonic acid and 1.8 g. of phosphorous pentachloride cooled in an ice bath, add portionwise 2.0 g. of 2-acetamido-5-chlorothiophene over about a 15 minute interval. Raise the temperature of the reaction mixture over about a 15 minute period to about 70° C. and maintain at that temperature for about 1 hour. Pour the reaction mixture onto ice with stirring and extract the mixture with ether. Wash the ether solution with water and then saturate the ethereal solution with ammonia with stirring. Allow the reaction to continue for about 15 minutes then evaporate the solvent. Triturate the resulting solid with a small volume (10 ml.) of water and filter. Dry the product at about 60° C. and cystallize from acetone-water to yield 0.75 g. of 2-acetamido-5-chlorothiophene-3-sulfonamide.

Heat the 0.75 g. of 2-acetamido-5-chlorothiophene 3-sulfonamide with 20 ml. of 10% aqueous sodium carbonate to about 90° C. and maintain for about 1½ hours. Treat the solution with decolorizing charcoal, filter and cool the filtrate to about room temperature. Refilter to remove any remaining starting material and acidify the filtrate. Collect the thus formed precipitate by filtration and crystallize from aqueous methanol to give 6-chloro-3-methyl-4H-thieno[2,3-e][1,2,4]thiadiazine-1,1-dioxide.

EXAMPLE 2

6-chloro-3-propyl-4H-thieno[2,3-e][1,2,4]thiadiazine-1,1-dioxide (A) 2-n-butyramido - 5 - chlorothiophene.—Add 22 g. of zinc dust in small portions to a stirred solution of 20 g. of 2-chloro-5-nitrothiophene in 200 ml. of n-butyric acid and 60 ml. of n-butyric anhydride at 0° C. Allow the reaction to proceed for about 1 hour at 0° C., followed by a further 3 hours at room temperature, after which the reaction mixture is heated to about 70° C. for an additional 15 to 30 minutes. Filter the suspension and concentrate the filtrate to a residue in vacuo. Dissolve the residue in hexane and chromatograph on a column containing about 300 g. of silica gel. Elute the product benzene-chloroform and purify by crystallization from aqueous methanol to give 2-n-butyramido-5-chlorothiophene.

(B) 2-n-butyramido - 5 - chlorothiophene - 3 - sulfonamide.—To a stirred mixture of 50 ml. of chlorosulfonic acid and 9 g. of phosphorous pentachloride cooled in an ice bath, add portionwise 10 g. of 2-n-butyramido-5-chlorothiophene over about a 15 minute interval. Raise the temperature of the reaction mixture over about a 15 minute period to about 70° C. and hold at that temperature for about 1 hour. Pour the reaction mixture onto ice with stirring and extract the mixture with ether. Wash the ether solution with water and then saturate the ethereal solution with ammonia with stirring. Continue the reaction for about 5 minutes and evaporate the solvent. Triturate the resulting solids with a small volume (10 ml.) of water and filter. Dry the product at about 60° C. and crystallize from acetone water to yield 2-n-butyramido-5-chlorothiophene-3-sulfonamide.

(C) 6 - chloro - 3 - propyl - 4H - thieno[2,3-e][1,2,4] thiadiazine-1,1-dioxide.—Heat 5 g. of 2-n-butyramido-5-chlorothiophene - 3 - sulfonamide with 50 ml. of methanol containing 0.5 g. sodium methoxide to reflux and maintain for about 2 hours. Treat the solution with decolorizing charcoal, filter and concentrate the filtrate to a small volume in vacuo. Add 50 ml. of water and remove the remaining methanol in vacuo. Re-filter to remove any residual starting material and acidify the filtrate. Collect the thus formed precipitate by filtration and crystallize from aqueous methanol to give 6-chloro-3 - propyl - 4H - thieno[2,3-e][1,2,4]thiadiazine - 1,1-dioxide.

It is apparent to one skilled in the art, that the procedures of the foregoing examples may be employed to prepare other thieno[1,2,4]thiadiazine - 1,1 - dioxides of which the following are exemplary:

3-ethyl-6,7-dichloro-4H-thieno[2,3-e][1,2,4]thiadiazine-1,1-dioxide, 3-phenyl-6-trifluoromethyl-4H-thieno[2,3-e][1,2,4]thiadiazine-1,1-dioxide, 3-(2,2,2-trifluoroethyl)-6-bromo-4H-thieno[2,3-e][1,2,4] thiadiazine-1,1-dioxide, 3-benzyl-6-methyl-4H-thieno[2,3-e][1,2,4]thiadiazine-1,1-dioxide, 3-(2-cyclopentenyl)-6,7-diethyl-4H-thieno[2,3-e][1,2,4] thiadiazine-1,1-dioxide, 3-(2-phenylethyl)-6-trifluoromethyl-7-chloro-4H-thieno [2,3-e][1,2,4]thiadiazine-1,1-dioxide, 3-ethyl-6-isopropyl-7-bromo-4H-thieno[2,3-e][1,2,4] thiadiazine-1,1-dioxide, 3-isopropyl-6-chloro-4H-thieno[2,3-e][1,2,4]thiadiazine-1,1-dioxide, 3-cyclopropyl-6-ethyl-4H-thieno[2,3-e][1,2,4]thiadiazine-1,1-dioxide, 3-trifluoromethyl-6-t-butyl-4H-thieno[2,3-e][1,2,4] thiadiazine-1,1-dioxide, 3-vinyl-6-bromo-4H-thieno[2,3-e][1,2,4]thiadiazine-1,1-dioxide, 3-(1-propenyl)-6-methyl-4H-thieno[2,3-e][1,2,4] thiadiazine-1,1-dioxide, 3-(2-cyclopentenyl)-6-chloro-4H-thieno[2,3-e][1,2,4] thiadiazine-1,1-dioxide, 3-(3-cyclohexenyl)-6-methyl-4H-thieno[2,3-e][1,2,4] thiadiazine-1,1-dioxide, 3-(1-propenyl)-6-trifluoromethyl-4H-thieno[2,3-e] [1,2,4]thiadiazine-1,1-dioxide, 3-(2-phenylethyl)-6-iodo-4H-thieno[2,3-e][1,2,4] thiadiazine-1,1-dioxide, 3-(3-chloropropyl)-6-chloro-4H-thieno[2,3-e][1,2,4] thiadiazine-1,1-dioxide, 3-dichloromethyl-6-methyl-4H-thieno[2,3-e][1,2,4] thiadiazine-1,1-dioxide, 3-ethyl-6-bromo-4H-thieno[2,3-e][1,2,4]thiadiazine-1,1-dioxide, 3-(1-propenyl)-6-trifluoromethyl-4H-thieno[2,3-e] [1,2,4]thiadiazine-1,1-dioxide, 3-cyclobutyl-6,7-dichloro-4H-thieno[2,3-e][1,2,4]thiadiazine-1,1-dioxide,
3-phenyl-6,7-dimethyl-4H-thieno[2,3-e][1,2,4]thiadiazine-1,1-dioxide,
3-benzyl-6-chloro-7-methyl-4H-thieno[2,3-e][1,2,4]thiadiazine-1,1-dioxide,
3-(3-cyclopentenyl)-6,7-dibromo-4H-thieno[2,3-e][1,2,4]thiadiazine-1,1-dioxide and the tautomers thereof.

In a similar manner, the procedures of the foregoing examples may be employed to produce X, Y-substituted thieno[3,2-e][1,2,4]thiadiazine-1,1-dioxide of which the following compounds are exemplary:

3-ethyl-5,6-dichloro-4H-thieno[3,2-e][1,2,4]thiadiazine-1,1-dioxide,
3-phenyl-6-trifluoromethyl-4H-thieno[3,2-e][1,2,4]thiadiazine-1,1-dioxide,
3-(2,2,2-trifluoroethyl)-6-bromo-4H-thieno[3,2-e][1,2,4]thiadiazine-1,1-dioxide,
3-benzyl-6-methyl-4H-thieno[3,2-e][1,2,4]thiadiazine-1,1-dioxide,
3-(2-cyclopentenyl)-5,6-diethyl-4H-thieno[3,2-e][1,2,4]thiadiazine-1,1-dioxide,
3-(2-phenylethyl)-6-trifluoromethyl-6-chloro-4H-thieno[3,2-e][1,2,4]thiadiazine-1,1-dioxide,
3-ethyl-5-isopropyl-6-bromo-4H-thieno[3,2-e][1,2,4]thiadiazine-1,1-dioxide,
3-isopropyl-6-chloro-4H-thieno[3,2-e][1,2,4]thiadiazine-1,1-dioxide,
3-(1-propenyl)-6-iodo-4H-thieno[3,2-e][1,2,4]thiadiazine-1,1-dioxide,
3-vinyl-6-bromo-4H-thieno[3,2-e][1,2,4]thiadiazine-1,1-dioxide,
3-(3-chloropropyl)-6-chloro-4H-thieno[3,2-e][1,2,4]thiadiazine-1,1-dioxide,
3-dichloromethyl-6-methyl-4H-thieno[3,2-e][1,2,4]thiadiazine-1,1-dioxide,
3-ethyl-6-bromo-4H-thieno[3,2-e][1,2,4]thiadiazine-1,1-dioxide,
3-(1-propenyl)-6-trifluoromethyl-4H-thieno[3,2-e][1,2,4]thiadiazine-1,1-dioxide,
3-cyclobutyl-5,6-dichloro-4H-thieno[3,2-e][1,2,4]thiadiazine-1,1-dioxide,
3-phenyl-5,6-dimethyl-4H-thieno[3,2-e][1,2,4]thiadiazine-1,1-dioxide,
3-benzyl-5-chloro-6-methyl-4H-thieno[3,2-e][1,2,4]thiadiazine-1,1-dioxide,
3-(3-cyclopentenyl)-5,6-dibromo-4H-thieno[3,2-e][1,2,4]thiadiazine-1,1-dioxide and the tautomers thereof Similarly, the teaching of Examples 1 and 2 may be employed to produce X, Y-substituted thieno[3,4-e][1,2,4]thiadiazine-1,1-dioxides, the following compounds being exemplary thereof:

3-(3-chloropropyl)-5,7-dichloro-4H-thieno[3,4-e][1,2,4]thiadiazine-1,1-dioxide,
3-dichloromethyl-5,7-dimethyl-4H-thieno[3,4-e][1,2,4]thiadiazine-1,1-dioxide,
3-ethyl-5,7-dibromo-4H-thieno[3,4-e][1,2,4]thiadiazine-1,1-dioxide,
3-(1-propenyl)-5,7-trifluoromethyl-4H-thieno[3,4-e][1,2,4]thiadiazine-1,1-dioxide,
3-cyclobutyl-5-chloro-7-methyl-4H-thieno[3,4-e][1,2,4]thiadiazine-1,1-dioxide,
3-phenyl-5,7-dimethyl-4H-thieno[3,4-e][1,2,4]thiadiazine-1,1-dioxide,
3-benzyl-5,7-dichloro-4H-thieno[3,4-e][1,2,4]thiadiazine-1,1-dioxide,
3-ethyl-5,7-dichloro-4H-thieno[3,4-e][1,2,4]thiadiazine-1,1-dioxide,
3-(2,2,2-trifluoroethyl)-5,7-dibromo-4H-thieno[3,4-e][1,2,4]thiadiazine-1,1-dioxide,
3-(2-phenylethyl)-5-trifluoromethyl-7-chloro-4H-thieno[3,4-e][1,2,4]thiadiazine-1,1-dioxide,
3-(2-cyclopentenyl)-5,7-diethyl-4H-thieno[3,4-e][1,2,4]thiadiazine-1,1-dioxide,
3-vinyl-5,7-diethyl-4H-thieno[3,4-e][1,2,4]thiadiazine-1,1-dioxide,
3-trifluoromethyl-5,7-diiodo-4H-thieno[3,4-e][1,2,4]thiadiazine-1,1-dioxide,
3-(3-cyclohexenyl)-5,7-dipropyl-4H-thieno[3,4-e][1,2,4]thiadiazine-1,1-dioxide,
3-(3-chloropropyl)-5,7-dimethyl-4H-thieno[3,4-e][1,2,4]thiadiazine-1,1-dioxide,
3-phenyl-5,7-dichloro-4H-thieno[3,4-e][1,2,4]thiadiazine-1,1-dioxide,
3-(1-propenyl)-5,7-di-t-butyl-4H-thieno[3,4-e][1,2,4]thiadiazine-1,1-dioxide,
3-benzyl-5,7-dibromo-4H-thieno[3,4-e][1,2,4]thiadiazine-1,1-dioxide,
3-benzyl-5,7-diethyl-4H-thieno[3,4-e][1,2,4]thiadiazine-1,1-dioxide, and the tautomers thereof.

It is apparent to a chemist skilled in the art that the instant novel compounds are acidic in character, and indeed, are soluble in aqueous alkali. The alkali metal salts of these compounds may be prepared by methods well-known in the art for the preparation of a salt of a strong base with a weak acid. Although the alkali metal salt, as indicated hereinbefore, may be obtained on evaporation of an alkaline solution of a compound of this invention, it is preferred to employ a non-aqueous media. For example, by mixing together an alcoholic solution of a compound of this invention with an alcoholic solution containing a stoichiometric quantity of an alkali metal alkoxide and evaporating the solvent, there is obtained the alkali metal salt. In particular, by reacting stoichiometric quantities of 6-chloro-3-propyl-4H-thieno[2,3-e][1,2,4]thiadiazine-1,1-dioxide and sodium methoxide in anhydrous methanol, and evaporating the solvent, there is obtained the sodium salt of 6-chloro-3-propyl-4H-thieno[2,3-e][1,2,4]thiadiazine-1,1-dioxide as a white solid which is soluble in water.

The manner of using the invention sought to be patented in its process aspect will now be described:

The compounds of our invention may be used in the form of pharmaceutical preparations which contain the active ingredients in admixture with a pharmaceutical carrier suitable for enteral or parenteral administration. Such preparations may be in solid forms, as for example, tablets, capsules, and suppositories, or in liquid forms, as, for example, elixirs, emulsion and injectables.

In the formulation of pharmaceutical preparations there can be employed such substances which do not react with the active ingredients, for example, water, gelatin, lactose, starches, magnesium stearate, calcium carbonate, talc, vegetable oils, benzyl alcohol, gums, polyalkylene glycols, and petroleum jelly. The active ingredient is preferably present in the preparation in such proportion by weight that the active ingredient in the formulation to be administered lies between 0.1% and 50%. It is preferred that the compounds of this invention be administered in doses ranging from 60 to 120 mg. per kg. per day in divided doses given at intervals of from about 3 to about 6 hours.

In addition to the above enumerated excipients which are incorporated into the composition of this invention, an additional active ingredient may also be included. The need for such additional ingredient depends upon such factors as the individual characteristics of the host, the severity of the malady being treated, potency of active ingredient and the like. For example, in some instances, it may be advantageous to incorporate with the compounds of this invention a therapeutically effective quantity of a diuretic.

The tangible embodiments of this invention elicit a pronounced anti-hypertensive effect in a pharmacological test utilizing rats with desoxycorticosterone acetate induced hypertension. The procedure is well-known and the results obtained therewith usually carry over into other mammalian species. The foregoing is corroborated by a further test using dogs; the test is described by Prioli, N. A. and Winbury, M. M., in the Journal of Applied Physiology, vol. 15, No. 2, March 1960.

EXAMPLE 3

Tablet formulation

The following formulation provides for the manufacture of 1000 tablets:

| | Grams |
|---|---|
| (1) 6-chloro-3-methyl-4H-thieno[2,3-e][1,2,4]thiadiazine-1,1-dioxide | 25 |
| (2) Lactose, U.S.P. | 181 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 gm. of corn starch in 100 ml. of hot distilled water. Dry the resulting granulation at 40–45° C. and pass it through a No. 16 mesh screen. To the dried, screened granulation add a blended mixture of the active ingredient (1) and the magnesium stearate. Thoroughly blend and then press into tablets of 300 mg. each.

EXAMPLE 4

Capsule formulation

The following formulation provides for the manufacture of 1000 capsules:

| | Grams |
|---|---|
| (1) 6-chloro-3-methyl-4H-thieno[2,3-e][1,2,4]thiadiazine-1,1-dioxide | 25 |
| (2) Lactose | 273.5 |
| (3) Magnesium stearate | 1.5 |

Mix active ingredient (1) with lactose and blend in the magnesium stearate. Fill hard gelatin capsules with 300 mg. each of the blended mixture to produce capsules containing 25 mg. of 3 - methyl - 7-chloro-1,2,4-benzothiadiazine-1,1-dioxide.

EXAMPLE 5

Parenteral formulation

The following formulation provides for the manufacture of 1000 vials each containing 10 mg. of active ingredient, as its sodium salt:

| | Grams |
|---|---|
| (1) 6 - chloro - 3 - methyl - 4H - thieno[2,3-e][1,2,4]thiadiazine - 1,1 - dioxide sodium salt | 10.95 |
| (2) Monobasic potassium phosphate | 6.0 |
| (3) Water for injection, U.S.P. q.s. 1.0 l. | |

Dissolve ingredients (1), (2) and (3) in approximately 80 percent of the volume of water and filter the resulting solution. Add to the filtrate sufficient water to make a 1000 ml. volume. Sterile-filter the solution and aseptically fill one milliliter portion of the so-prepared solution into two milliliter vials then lyophilize. After the lyophilized cake is dry, aseptically stopper the vials with rubber plugs and seal.

I claim:
1. A method of treating hypertension which comprises administering to a hypertensive mammal an anti-hypertensively effective quantity of a thieno[1,2,4]thiadiazine-1,1-dioxide selected from the group consisting of compounds of the formula:

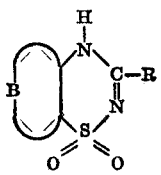

and the tautomers and the alkali metal salts thereof, wherein R is a member selected from the group consisting of hydrogen, lower alkyl, halogeno lower alkyl, lower alkenyl, phenyl, benzyl and phenethyl; B together with the carbon atoms to which it is attached represents a fused X, Y-substituted thieno moiety wherein X is a member selected from the group consisting of halogen, trifluoromethyl and lower alkyl and Y is a member selected from the group consiting of hydrogen, halogen, trifluoromethyl and lower alkyl; provided that when Y is adjacent to the sulfur atom of the thieno moiety, it is other than hydrogen.

2. The method according to claim 1 wherein the therapeutically effective quantity is in the range of from 60 to 120 mg. of said thieno[1,2,4]thiadiazine - 1,1 - dioxide per kilogram weight of said mammal per day.

3. A method according to claim 1 wherein the thieno[1,2,4]thiadiazine-1,1-dioxide is a member selected from the group consisting of compounds of the formula:

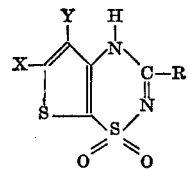

and the tautomers and the alkali metal salts thereof, wherein R, X and Y are as defined in claim 1.

4. A method according to claim 1 wherein the thieno[1,2,4]thiadiazine-1,1-dioxide is a member selected from the group consisting of compounds of the formula:

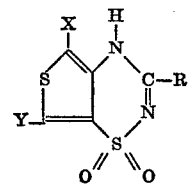

and the tautomers and the alkali metal salts thereof, wherein R, X and Y are as defined in claim 1.

5. A method according to claim 1 wherein the thieno[1,2,4]thiadiazine-1,1-dioxide is a member selected from the group consisting of compounds of the formula:

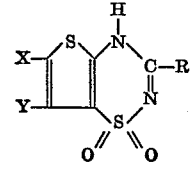

and the tautomers and the alkali metal salts thereof, wherein R, X and Y are as defined in claim 1.

6. The method of claim 1 wherein said anti-hypertensive effect is elicited by administering 6-chloro-3-methyl-4H-thieno[2,3-e][1,2,4]thiadiazine-1,1-dioxide.

7. The method of claim 1 wherein said anti-hypertensive effect is elicited by administering 6-chloro-3-propyl-4H-thieno[2,3-e][1,2,4]thiadiazine-1,1-dioxide.

References Cited

Chemical Abstracts, vol. 55, pp. 5455–5456 (1961).

JEROME D. GOLDBERG, Primary Examiner

UNITED STATES PATENT OFFICE
CERTIFICATE OF CORRECTION

Patent No. 3,733,409　　　　　　　　Dated May 15, 1973

Inventor(s) John G. Topliss

It is certified that error appears in the above-identified patent and that said Letters Patent are hereby corrected as shown below:

Column 3, line 3, "acylaminodothiophene" should read --acylamidothiophene--. Column 3, line 4, "2-acylamindothiophene" should read --2-acylamidothiophene--. Column 9, claim 1, " 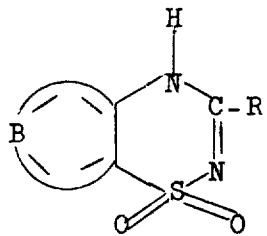 " should read -- 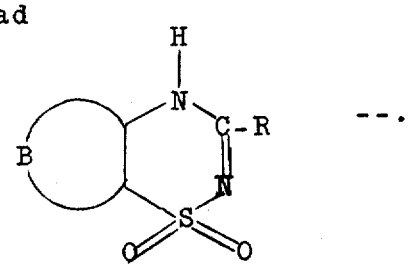 --.

Signed and sealed this 19th day of March 1974.

(SEAL)
Attest:

EDWARD M. FLETCHER, JR.　　　　C. MARSHALL DANN
Attesting Officer　　　　　　　Commissioner of Patents